(12) United States Patent
Ndiaye et al.

(10) Patent No.: US 12,501,916 B2
(45) Date of Patent: Dec. 23, 2025

(54) SUNFLOWER SEED PROTEIN CONCENTRATE FOR FOOD APPLICATIONS AND METHOD OF MANUFACTURING THE SAME

(71) Applicant: Avril, Paris (FR)

(72) Inventors: Mbalo Ndiaye, Saint Jacques de la Lande (FR); Marine Bianeis, Le Rheu (FR)

(73) Assignee: AVRIL, Paris (FR)

( * ) Notice: Subject to any disclaimer, the term of this patent is extended or adjusted under 35 U.S.C. 154(b) by 509 days.

(21) Appl. No.: 17/787,871

(22) PCT Filed: Dec. 22, 2020

(86) PCT No.: PCT/EP2020/087707
§ 371 (c)(1),
(2) Date: Jun. 21, 2022

(87) PCT Pub. No.: WO2021/130273
PCT Pub. Date: Jul. 1, 2021

(65) Prior Publication Data
US 2023/0027634 A1    Jan. 26, 2023

(30) Foreign Application Priority Data
Dec. 23, 2019 (EP) .................................. 19306764

(51) Int. Cl.
*A23J 1/14*    (2006.01)
*A23J 3/22*    (2006.01)
*A23L 13/40*   (2023.01)

(52) U.S. Cl.
CPC .............. *A23J 1/142* (2013.01); *A23J 3/227* (2013.01); *A23L 13/426* (2016.08)

(58) Field of Classification Search
CPC ... A23C 9/1422; A23C 9/1307; A23C 9/1427; A23C 9/1512
(Continued)

(56) References Cited

U.S. PATENT DOCUMENTS 6,270,736 B1 *   8/2001   Barnes ............... B01D 11/0284
                                                   210/511
2011/0301074 A1  12/2011  Pickardt et al.
(Continued)

FOREIGN PATENT DOCUMENTS

| CN | 101326951 A | 12/2008 |
| WO | 2002/060273 A1 | 8/2002 |

(Continued)

OTHER PUBLICATIONS

G. Sripad et al., "Effect of Methods to Remove Polyphenols from Sunflower Meal on the Physicochemical Properties of the Proteins", Journal of Agricultural and Food Chemistry, vol. 35, No. 6, 1987, pp. 962-967.

(Continued)

Primary Examiner — Brent T O'Hern
(74) Attorney, Agent, or Firm — ArentFox Schiff LLP

(57) ABSTRACT

The invention relates to a method for obtaining a protein concentrate from sunflower seeds, to a sunflower seed concentrate and to a foodstuff comprising such a concentrate. The process comprises the use of a sunflower press cake and various extracting steps using an alcohol.

18 Claims, 3 Drawing Sheets

Pictures of the suspensions before heating

(58) Field of Classification Search
USPC .......................................................... 426/430
See application file for complete search history.

(56) References Cited

U.S. PATENT DOCUMENTS

| | | | |
|---|---|---|---|
| 2012/0009287 A1* | 1/2012 | Pickardt | ............... A23K 20/147 |
| | | | 530/424 |
| 2021/0153522 A1 | 5/2021 | Eisner et al. | |

FOREIGN PATENT DOCUMENTS

| | | |
|---|---|---|
| WO | 2010097238 A1 | 9/2010 |
| WO | 2013/013949 A1 | 1/2013 |
| WO | 2019048695 A1 | 3/2019 |

OTHER PUBLICATIONS

G. Vermeersch et al., "Les matières protéiques du tournesol en alimentation humaine" MPV de tournesol, 1987, pp. 333-344. Abstract.

Mohammad Saeed et al., "Sunflower Protein Concentrates and Isolates Low in Polyphenols and Phytate", Journal of Food Science, vol. 53, No. 4, 1988, pp. 1127-1131.

J. Sineiro et al., "Ethanol Extraction of Polyphenols in an Immersion Extractor. Effect of Pulsing Flow", JAOCS, vol. 73, No. 9 (1996) pp. 1121-1125.

Sergio Gonzalez-Perez et al., "Sunflower proteins overview of their physicochemical, structural and functional properties" Journal of the Science of Food and Agriculture, vol. 87, 2007, pp. 2173-2191.

Nayara K Scharlack et al., "Effect of the type and level of hydration on the simultaneous extraction of oil and chlorogenic acids from sunflower seed press cake", Journal of the Science of Food and Agriculture, vol. 97, 2017, pp. 4612-4620.

Souci et al.—Sunflower Seed—2015—pp. 903—XP55702121A.

Erica R. Baümler et al., "Extraction of sunflower oil using ethanol as solvent", Journal of Food Engineering, vol. 178, Jun. 2016, pp. 190-197.

Philippe Van Doosselaere "Production of Oils", Edible Oil Processing, Second Edition, Chapter 3, Jun. 4, 2013, pp. 86-138.

Giancarlo Sodini et al., "Acidic Butanol Removal of Color-Forming Phenols From Sunflower Meal," Journal of Agricultural and Food Chemistry, 25, 4, Jul. 1, 1977, pp. 822-825.

Aruna Venktesh et al., "Functional Properties of the Total Proteins of Sunflower (*Helianthus annuus* L.) Seed—Effect of Physical and Chemical Treatments", Journal of Agricultural & Food Chemistry, vol. 41, No. 1, Jan. 1993, pp. 18-23.

J. Laisney, "Processes for Obtaining Oils and Fats," Oils & Fats Manual, Chapter 9, 1996, pp. 715-751.

Konstantina Kyriakopoulou et al., "Plant-Based Meat Analogues", Sustainable Meat Production and Processing, Elsevier Inc, 2019, pp. 103-125.

Bertrand Matthäus, "Oil Technology", Advances in Botanical Research, vol. 45, Incorporating Advances in Plant Pathology, Elsevier Ltd., 2007, pp. 484-527.

Ernie H. Unger, "Commercial Processing of Canola and Rapeseed: Crushing and Oil Extraction", Canola and Rapeseed, Chapter 14, Van Nostrand Reinhold, 1990, pp. 235-249.

WHO, "General methods used for determining protein and amino acid requirements", WHO Technical Report Series 935: Protein and Amino Acid Requirements in Human Nutrition, 2007, 49-51.

Regitano-D'Arce et al, "Sunflower seed protein concentrates and isolates obtention from ethanol oil extraction meals—(Technical note)", Archivos Latinoamericanos De Nutrición : Organo Oficial De La Sociedad Latinoamericana De Nutrición, SLAN, vol. 44, No. 1, 1994, pp. 33-35.

FÉvrier, "La valeur nutritionnelle des matières protéiques végétales", Protéines Végétales: Collection : Sciences et techniques agroalimentaires, Éditeur: Tec et Doc—Lavoisier, 1996, pp. 588-590.

Rahma et al, "Removal of polyphenols from sunflower meal by various solvents: effects on functional properties", Journal of Food Science, Jan. 1, 1981, vol. 46, No. 5, pp. 1521-1536.

Rahma et al, "Characterization of Sunflower Proteins", Journal of Food Science, Mar. 1, 1979, vol. 44, No. 2, pp. 579-582.

International Search Report and Written Opinion mailed Jan. 18, 2022 issued in PCT/EP2021/075724.

* cited by examiner

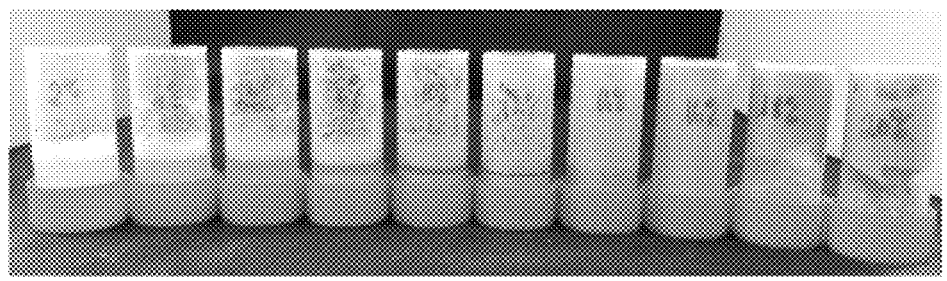
Figure 1. Pictures of the suspensions before heating
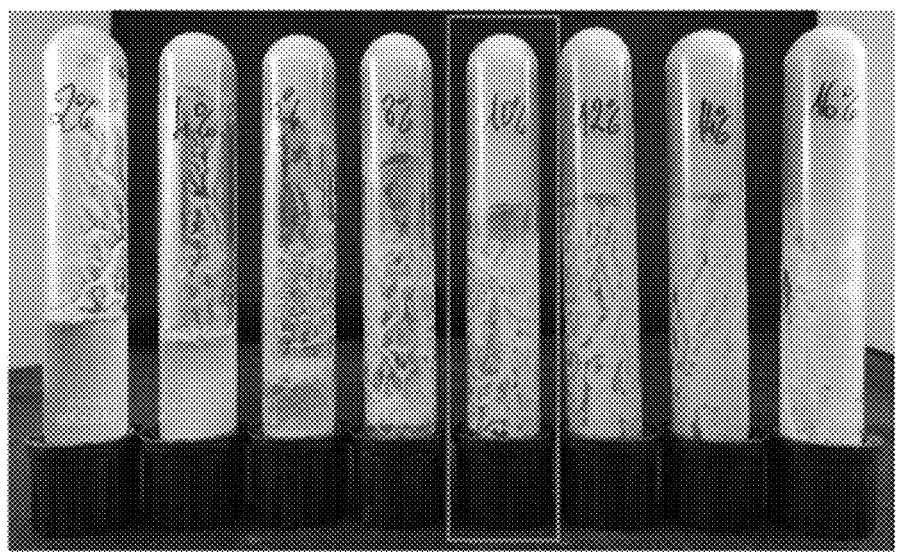
Figure 2. Pictures of the suspensions after heating

SUNFLOWER SEED PROTEIN CONCENTRATE FOR FOOD APPLICATIONS AND METHOD OF MANUFACTURING THE SAME

CROSS-REFERENCE TO RELATED APPLICATIONS

This application is a National Stage Entry of International Application No. PCT/EP2020/087707, filed Dec. 22, 2020, which claims priority to EP application No. 19306764.2, filed Dec. 23, 2019, the disclosures of each of which are hereby incorporated by reference in their entirety.

TECHNICAL FIELD

The invention relates to a method for obtaining a protein concentrate from sunflower seeds, to a sunflower seed concentrate and to a foodstuff comprising such a concentrate.

PRIOR ART

Oilseeds, such as sunflower seeds, are an important source of proteins having a high nutritional value. In particular, proteins contained in sunflower seeds are now widely used in the food industry as, for example, food additives or stabilisers, or as major nutritious components. Sunflower proteins are extracted as "concentrates" or "isolates" depending upon their degree of purity.

The usual process to obtain sunflower proteins is to extract the oil or fat contained in the seeds. To do so, pressing is used first. The press cake thus obtained is usually treated again, using solvent, in order to obtain a sunflower seed meal which is low in fat (see Chapter 3 of "Edible oil processing" (5 Aug. 2013) by Phillippe van Doosselaere, Ed. John Wiley & Sons).

Purification processes are necessary to remove or minimise the content of some non-protein natural components such as hulls, sugars (e.g. fructose, glucose, lactose, maltose, sucrose, raffinose and stachyose), fat or some, or all, polyphenols, such as chlorogenic acid, mainly for organoleptic reasons, and phytic acid.

Conversely, some non-protein components such as fibers, can provide some desirable effect not only for food application (e.g. to thicken and stabilise) but also contribute to a healthy diet.

Hence a great number of methods to treat sunflower meals in order to obtain various products and extracts are known.

Sunflower seed is rich in polyphenols and in particular chlorogenic acid (CGA). CGA and proteins can react together and cause the foodstuff to have a greenish/brownish colour. Furthermore, the phytic acid level is very high, ~10% on proteins, and can decrease protein digestibility.

It has been known for a long time that ethanol is effective to remove polyphenols from a sunflower meal, see G. Sripadl and M. S. Narasinga Rao "*Effect of Methods To Remove Polyphenols from Sunflower Meal on the Physicochemical Properties of the Proteins*" J. Agric. Food Chem. 1987, 35, 962-967. However, the use of such a relatively high concentration of methanol and ethanol (above 40%), was also described as bringing about denaturation (or conformational changes) in proteins. These changes are often perceived as undesirable.

Hence the use of ethanol in the purification of sunflower meal had not been particularly studied for some time.

More recently WO 2002/060273 A1 (TNO) describes a method to remove phenolic compounds from an aqueous extract of a sunflower meal using e.g. ethanol at a concentration of up to 30%. It is further described that a concentration of ethanol ranging from 5 to 15% (v/v) together with a pH adjustment at pH 5 is beneficial to the removal of polyphenols.

WO 2013/013949 A1 (DSM IP ASSETS) describes that the concentration of ethanol can be increased up to 70% aqueous ethanol when used on an aqueous extract of a seed oil cake in order to precipitate the protein, this to obtain a very pure isolate. It discloses that ethanol allows to remove phytates and phenolics (including chlorogenic acid) which were perceived as "anti-nutritional".

Venktesh A. et al: ". ("FUNCTIONAL PROPERTIES OF THE TOTAL PROTEINS OF SUNFLOWER (*HELIANTHUS ANNUUS* L.) SEED-EFFECT OF PHYSICAL AND CHEMICAL TREATMENTS", Journal of Agricultural and Food Chemistry, American Chemical Society, books and journals division, us, vol. 41, no. 1, 1 Jan. 1993) describes a lengthy process wherein hexane-extracted sunflower flours are washed 7 times with undiluted acidic butanol. No presscake is used as a starting material nor steps including the use of diluted alcohol and/or a mixture of alkali/alcohol. The sunflower products thus obtained appear to have some substantially lower functional properties compared to the control, in particular in terms of water absorption capacity. Baumler E. R. et al." ("Extraction of sunflower oil using ethanol as solvent", JOURNAL OF FOOD ENGINEERING, BARKING, ESSEX, GB, vol. 178, 22 Jan. 2016, pages 190-197) describes an oil extraction process where ethanol can be used as a solvent to replace hexane. Baumler does not use diluted alcohol and/or a mixture of alkali/alcohol in its process.

SUMMARY OF VARIOUS EMBODIMENTS

To remove more fat from the press cake it has been customary to use non-polar solvent such as alkanes as organic extractants, and in particular hexane (see G. Sripadl et al, supra). Although hexane is one the most efficient oil extracting solvent at the industrial scale, there is today a need to look for an alternative process which is both more environmentally friendly and which produces high yield of a sunflower concentrate comprising a high level of proteins and fibers (such as cellulose) and a low level of fat, sugars, polyphenols and/or phytic acid. There is also a need to provide a protein concentrate that can be an alternative to soy protein concentrate in term of colour holding (i.e. as light as possible), appearance and/or emulsifying and/or water holder capacity.

This problem is solved by using a series of specific alcoholic and/or hydro alcoholic washes onto a sunflower press cake.

An object of the invention is therefore a process for producing a protein concentrate from sunflower seed, comprising the steps of:
a) pressing said oilseed to form a sunflower seed press cake;
b) de-oiling said sunflower press cake by mixing said sunflower seed press cake with an alcohol and removing the alcohol from a solid de-oiled sunflower seed meal;
c) extracting said de-oiled sunflower seed meal at a pH ranging from 3 to 6 with a first solution comprising an alcohol diluted with water to obtain a first extracted solid and removing said first solution from said first extracted solid;

d) extracting said first extracted solid, preferably at a pH ranging from 5.5 to 7.5, with a second solution comprising, consisting essentially or consisting of, an alcohol, which may be diluted with water, in the presence of an alkali, to obtain a second extracted solid and removing said second solution from said second extracted solid;

e) eventually extracting said second extracted solid with an alcohol to obtain a sunflower seed protein concentrate; and f) recovering said sunflower seed protein concentrate.

DETAILED DESCRIPTION

Starting Material

Sunflower seed refers to seed from an oil plant from the species *Helianthus annuus* (sunflower). Depending upon the context of the present invention the term "seed" includes cleaned seed, (fully) dehulled seed (kernels), partially dehulled seed and flaked seed.

Processing steps of sunflower seed cleaning are well known in the art (Laisney, 1984; Unger, 1990). The seed cleaning step includes removing dust and foreign matter, such as parts of the oilseed plant, weed seeds, grains, from the oilseed. The seed cleaning step produces a "cleaned oilseed".

Processing steps of sunflower seed dehulling are also well known in the art (Laisney, 1984; Matthaus, 2012). The dehulling step includes removing the hull from the seed. The dehulling step produces a "dehulled seed". At the industrial scale, the dehulling is generally partial and such starting material is preferred. By partially dehulled oilseed, it is meant that the oilseed have a hull content (w/w) of less than 20% w/w (%/DM), preferably less than 10% w/w (%/DM).

However total dehulling is known to be achieved industrially in some countries. Therefore, the use of totally dehulled seed (i.e. kernels) is also encompassed by the invention. According to a preferred embodiment of the invention, the sunflower seed used in the process of the invention comprise, or are, kernels. Kernels consist, or consist essentially of fully dehulled sunflower seeds. By "consist essentially" it is meant that the seeds used are at least 95%, preferably 98% and more advantageously 99% kernels in weight percent over the total dry matter weight (%/DM w/w).

Processing steps of seed flaking are well known in the art (Laisney, 1984; Unger, 1990; Matthäus, 2012). In certain embodiments, the seed can be pre-heated before flaking at a temperature generally ranging from 30° C. to 40° C. The flaking step produces a "flaked oilseed". The flaking step is achieved in a flaking mill, through flaking rolls.

Pressing

Processing steps of oilseed pressing are well known in the art (Laisney, 1984; Unger, 1990; Matthaus, 2012). The pressing step includes partially removing the oil from the oilseed, i.e., removing at least 60% (w/w) of the oil from the oilseed.

The pressing step according to the present invention is preferably a cold-pressing step since the oilseed is preferably not cooked (as defined below) prior to its passing through the press. In the press the seed (e.g. kernels) are crushed and some of the seed oil is thus expelled. Even during the pressing step, it is preferred that the temperature of the oilseed does not go beyond 85° C., preferably 80° C., more preferably 74° C. The pressing step is achieved (mechanically) in a press, preferably a screw press. The process is advantageously carried out at a temperature above room temperature such as equal or above to 22° C. A preferred screw press is a barrel-type screw press with vertically split hinged barrel, such as the type commercially available from CPM SKET GmbH (Germany) or MBU20 sold by the French Company OLEXA (Feuchy, FR). According to an advantageous embodiment of the invention, the moisture content of the oilseed at the inlet of the press, or before the pressing, is ranging from 2% to 6%, preferably from 3% to 5%. Hence the process of the invention may advantageously include a step of moisturizing and/or drying the oilseed prior to carrying out the pressing step, in order to achieve the advantageous moisture content. In another advantageous embodiment of the invention, the temperature of the oilseed at the inlet of the press, or prior to the pressing step, is ranging from 10° C. to 40° C., preferably from 10° C. to 30° C., more preferably from 18° C. to 25° C., most preferably 20° C. to 22° C. The appropriate moisture content or temperature of the oilseed can be obtained by heating the over-moist/cold oilseed at a temperature of 50° C. or less prior to pressing, preferably at a temperature ranging from 30° C. to 40° C. This would be particularly suitable when, for example, the oilseed is stored under particular cold (e.g. winter) or wet conditions.

Due to press friction during the pressing step, the temperature of the oilseed is increasing. However, the temperature of the oilseed during the pressing step shall be maintained as of 80° C. or less and by order of increasing preference 75° C. or less, 72° C. or less, 69° C. or less, most preferably 67° C. or less. As it will be easily understood, it is also advantageous that the temperature does not drop too low. The temperature limit is generally considered to be about or above room temperature, e.g. 22° C. Advantageously, the temperature of the resulting oilseed press cake at the press outlet is ranging from 50° C. to 75° C., preferably 60° C. to 70° C. The pressing step produces an "oilseed press cake", also named "oilseed expeller". The pressing step according to the present invention can be repeated at least twice (double-pressing or more). The press cake used in the process of the invention can be an expanded material (known as collets) or a non-expanded one. It is however preferred to use a non-expanded press cake. According to a preferred embodiment of the invention the sunflower seed press cake has an oil content ranging from 7% to 30% dry w/w, advantageously 8% to 28% dry w/w. The oil content of the oilseed press cake can depend on the temperature of the oilseed during the pressing or the number of pressing steps. By way of example, the sunflower seed press cake obtained by cold-pressing at a temperature of 74° C. or less (e.g. 64° C. to 70° C.) can have an oil content ranging from 12% to 27% dry w/w, in particular from 19% to 27% dry w/w, determined by the adapted Soxhlet extraction method.

De-Oiling Step

Once pressed, the remaining solid material is a sunflower seed press cake. This press cake is then treated according to the process of the invention to at least one, and preferably at least five (5), de-oiling step(s) by mixing the sunflower seed press cake with an alcohol to obtain a sunflower seed meal.

According to a particularly preferred aspect of the invention, the sunflower seed, the pressed sunflower seed (i.e., sunflower seed press cake), and more generally the product obtained according to the process of the invention, is not treated with hexane, n-hexane or a non-polar solvent. Thus, the product obtained from the method of the invention is not contacted with such a solvent at any time during the process and the process does therefore not include the use of such a compound or compounds.

The alcohol compound to be used in the invention is preferably chosen in the group of C1 to C20 aliphatic organic compounds, branched or not branched, that carry at least one hydroxyl functional group, and their mixture thereof. According to another preferred embodiment of the invention the alcohol solvent is a lower (C1 to C6) aliphatic alcohol, such as ethanol, isopropanol, methanol, or a mixture thereof, preferably ethanol. Amongst these, ethanol is the alcohol which appears the most suitable. As it is well known and well understood in the art, alcohols are hydrophilic compounds and usually contain in their commercial form a small amount of water. Hence the alcohol to be used can contains a small amount of water, in general 96% (v/v), and in particular 96% (v/v), ethanol is the alcohol most commonly used, but higher concentration, such as up to 99% (e.g. absolute alcohol) can also be used. According to a preferred embodiment, the total amount of water used in the de-oiling step does not exceed 10% (v/v), preferably 5% (v/v) and advantageously 4% (v/v).

Other compounds, in particular polar solvent to the exclusion of water, can be used in association with the alcohol to make a de-oiling solvent. However, according to a preferred embodiment, only alcohol(s) is used to minimise the costs and the environmental impact of the process. It should be noted that the term "an alcohol" used therein encompasses also a mixture of alcohols.

Preferably, the sunflower seed press cake:deoiling solvent total ratio can range from 1:10 to 1:25 w/w, preferably 1:15 to 1:20, e.g. about 1:18. By total ratio it is meant the weight ratio of the sunflower seed press cake before being processed over the total weight of deoiling solvent used to carry out the de-oiling, this includes the total amount of deoiling solvent used for all the steps when this deoiling step is repeated.

According to a particular embodiment of the invention, the temperature set during the de-oiling step is ranging from 50° C. to 70° C., preferably from 55° C. to 65° C.

According to another advantageous embodiment of the invention the resident time of the sunflower seed press cake within the alcohol may range from 10 minutes to 30 minutes, preferably 15 minutes for each de-oiling step.

As it is usual the alcohol and the sunflower seed presscake can generally be admixed together by general stirring. When the de-oiling step is over the solid is separated from the liquid by usual liquid-solid separation such as filtration, decantation or sieving, with a meshed material, membrane or cloth (e.g. 10 μm meshed material). The hydrous-alcohol solvent extraction step is achieved in an extractor, such as an immersion extractor, an agitated filter tank or a percolation extractor (e.g., shallow bed percolation extractor), preferably an agitated filter tank or an immersion extractor. The solid material is a de-oiled sunflower seed meal. The term de-oiled is not meant to describe a product where no oil remains; it simply describes the fact that compared with the starting sunflower seed press cake, the resulting product presents less oil.

According to a particularly preferred embodiment of the invention it has been found that repeating the de-oiling step is advantageous. In particular it was found that repeating these steps more than 4, preferably more than 5, in particular more than 6, for example 7 or 8 times provides better results.

When more than one such a step is carried out, it can be beneficial to use a recycled alcohol (that is alcohol used from a previous de-oiling step) for all of the repeated steps.

Alternatively, recycled alcohol and fresh alcohol can be both used each for a distinct wash/step. It may also be more economical to use a mixture of fresh and recycled alcohol for some or all of the steps.

According to a preferred embodiment of the invention the de-oiled sunflower seed meal has an oil content ranging from 7% to 30% dry w/w, advantageously 7% to 15% dry w/w.

Acid Wash

According to the process of the invention, the de-oiled sunflower seed meal is then subjected to at least one, and preferably at least 5, extraction step(s) at a pH ranging from 3 to 6, preferably from 4 to 5, with a first solution comprising an alcohol diluted with water, generally by mixing these components.

The alcohol selected is one of the previously described alcohol and most preferably ethanol. This time, a solution of alcohol diluted with water (or hydrous alcohol) is used. In such a solution there is more than 10% (v/v) of water (or aqua) combined with the alcohol. Preferably the alcohol(s) chosen is present in a major amount (i.e. more than 50%) with respect to water. It is preferred to use a concentration of alcohol over water ranging from 70% to 90% (v/v), preferably from 75% to 85% (v/v), for example 80% (v/v).

Other compounds, in particular polar solvents, to the exclusion of water, can be used in association with the alcohol. However, according to a preferred embodiment, only alcohol(s) is used to minimise the costs and the environmental impact of the process. It should be noted that the term "an alcohol" used in the present specification encompasses mixture of alcohols.

According to an advantageous embodiment of the invention the pH during the extraction is ranging from 4 to 5. In order to adjust the pH of the first solution (solvent) a component acting as a pH regulator, such as an acid or a base, can be added. For example, this component can be a mineral or a salt such as an alkali, (e.g. NaOH), or a weak acid, such as citric acid, ascorbic acid, phosphoric acid or sodium bisulphite, preferably phosphoric acid. Phosphoric acid at a suitable concentration (e.g. 75% (v/v)) is preferred.

Preferably, the sunflower seed press cake:first solution (solvent) total ratio used can range from 1:15 to 1:25 w/w, preferably 1:20 to 1:23, e.g. about 1:22. By total ratio it is meant the weight ratio of the sunflower seed press cake before being processed over the total amount of first solution used to proceed to the wash. When the step is repeated this includes the total amount of first solution used for all the steps.

According to a particular embodiment of the invention, the temperature set during the extracting step is ranging from 45° C. to 65° C., preferably from 50° C. to 60° C.

According to another advantageous embodiment of the invention the resident time of the sunflower seed meal within the first solution (extracting solvent) may range from 10 minutes to 30 minutes, preferably around 15 minutes.

As it is usual the first solution (extracting solvent) and the sunflower seed meal can generally be admixed together by general stirring. When the extracting step is over, the solid is separated from the liquid (spent first solution) by usual liquid-solid separation as described above in reference for the de-oiling step.

According to a particularly preferred embodiment of the invention it has been found that repeating the extracting step is advantageous. In particular it was found that repeating these steps more than 4, preferably more than 5, in particular more than 6 is advantageous. For instance, 7 or 8 extracting steps provide better results.

When more than one such a step is carried out, it can be beneficial to use a recycled solvent (that is the spent first solution (extracting solvent) which was used from a previous extracting step) for all of the repeated steps. Alternatively, recycled solvent and fresh solvent can be both used each for a distinct wash/step. It may also be more economical to use a mixture of fresh and recycled alcohol for some or all of the steps.

The spent solution(s) (the first and subsequent solutions) above described are rich in free chlorogenic acid (CGA). CGA can therefore be extracted from this solution for further uses.

Alkali Wash

According to the process of the invention, the solid obtained from the previous step(s) is further extracted with a second solution consisting essentially of, or comprising, an alcohol in the presence of an alkali, generally by mixing these components. In the last case the alcohol may be diluted with water, an extracted solid is thus obtained. Preferably this extraction can be carried out at a pH ranging from 5.5 to 7.5, more preferably from 6 to 7.

The alcohol selected is one of the alcohol previously described and most preferably ethanol. The alcohol can be used pure, or nearly pure (95% v/v or above), or in a more diluted form in water (hydrous alcohol). When hydrous alcohol is used, it preferably contains more than 10% (v/v) of water (or aqua) combined with the alcohol. Preferably the alcohol(s) chosen is present in a major amount (i.e. more than 50%) with respect to water. It is preferred to use a concentration of alcohol over water ranging from 60% to 80% (v/v), preferably from 65% to 75% (v/v), for example 70% (v/v).

Other compounds, in particular polar solvents, to the exclusion of water, can be used in association with the alcohol. However, according to a preferred embodiment, only alcohol(s) is used to minimise the costs and the environmental impact of the process. It should be noted that the term "an alcohol" used therein encompasses mixture of alcohols.

According to an advantageous embodiment of the invention the pH during the extraction is ranging from 6 to 7. In order to adjust the pH of the hydrous-alcohol solvent an alkali (e.g. NaOH) is added. This alkali can be chosen in the group consisting of NaOH, $Ca(OH)_2$, KOH, $Na_2CO^{3-}$, and their mixtures thereof. Advantageously the alkali is NaOH. The proportion of alkali to be added to the solvent may range from 0.4% to 1% in weight, preferably to 0.5 to 0.7% in weight, with respect to the weight of the second solution.

Other compounds, in particular polar solvents to the exclusion of water, can be used in association with the diluted alcohol to make the second solution. However, according to a preferred embodiment, only alcohol(s) is used to minimise the costs and the environmental impact of the process.

Preferably, the sunflower seed press cake:second solution total ratio used can range from 1:3 to 1:7 w/w, preferably 1:4 to 1:6, e.g. about 1:5. By total ratio it is meant the weight ratio of the sunflower seed press cake over the total amount of second solution used in the wash. When the step is repeated this includes the total (cumulative) amount of second solution used for all the steps.

According to a particular embodiment of the invention, the temperature set during the alkali washing step is ranging from 45° C. to 65° C., preferably from 50° C. to 60° C.

According to another advantageous embodiment of the invention the resident time of the sunflower seed meal within the diluted alcohol (extracting solvent) may range from 10 minutes to 30 minutes, preferably around 15 minutes.

As it is usual the second solution (extracting solvent) and the sunflower seed meal can generally be admixed together by general stirring. When the extracting step is over the solid is separated from the liquid by usual liquid-solid separation as described above in reference for the de-oiling step.

The solid thus obtained is a protein concentrate according to the invention According to a particularly preferred embodiment of the invention it has been found that repeating the alkali washing step is advantageous. In particular it was found that repeating this step no more than 5 times, preferably no more than twice and most preferably only once was advantageous.

When more than one such a step is carried out, it can be beneficial to use a recycled solvent (that is the second solution (extracting solvent) which was used from a previous extracting step) for all of the repeated steps. Alternatively, recycled solvent and fresh solvent can be both used each for a distinct wash/step. It may also be more economical to use a mixture of fresh and recycled alcohol for some or all of the steps.

In a particularly preferred embodiment, the process of the invention comprises an additional, and preferably subsequent, extraction with an alcohol solvent (preferably ethanol) at a concentration of 90% w/w or more, preferably of at least 96%. This extraction solvent can advantageously be the same as the one used for the de-oiling step of the process according to the invention. Although more than one step can be carried out, it is preferred that this extraction step be carried out only once. In particular it is preferred to carry out this step when an hydrous alcohol was used in a previous extracting step. Hence when alcohol(s) per se (i.e. non-hydrous alcohol) is used as the last step of the alkali wash, this additional step is preferably not required.

Hydrous-Alcohol Solvent Desolventizing (Drying)

According to a preferred embodiment of the invention, the protein concentrate is subjected to a desolventizing step which may be achieved in a Down Draft Desolventizer (DDD), for example commercially available from Crown Iron Works (US). Alternatively it can be achieved in the agitated filter tank wherein the process has taken place by applying a vacuum (e.g. 0.5 to 0.8 bar, preferably 0.6 to 0.75 bar) and at a convenient temperature (e.g. below 70° C., preferably below 60° C.). According to an advantageous embodiment of the invention the resident time of the concentrate sunflower seed protein is ranging from 100 minutes to 200 minutes, preferably 120 minutes. Advantageously the temperature is lower than 70° C., preferably lower than 60° C. For example the temperature is ranging from 50 to 60° C., preferably for about 180±10 mins.

Advantageously, the oilseed protein concentrate is dried to reach moisture content ranging from 7% to 10%. This step produces a "dry oilseed protein concentrate".

Sieving (Sorting)

The dry oilseed protein concentrate can be subjected to at least one sieving (or sorting) step optionally preceded by at least one milling step. This optional sieving step allows obtaining a homogenous product close to soy protein concentrate. Sieving technology is well known in the art. For example, one can use sieving or plansifter machine or triboseparator. Advantageously, the oilseed protein concentrate has a D50 (µm) average particle size comprised, between 25 µm and 100 µm, preferably between 25 µm and 50 µm, more preferably between 30 µm and 40 µm.

According to one embodiment of the process of the invention, the alcohol used is ethanol in all of the process steps.

According to one embodiment of the process of the invention, the oilseed is not flaked prior to step a).

According to one embodiment of the process of the invention, it does not comprise microfiltration or diafiltration step.

According to one embodiment of the process of the invention, it does not comprise the use of a cyclone concentrator or a cyclone concentration step.

Sunflower Seed Protein Concentrate

Another object of the invention is an oilseed protein concentrate obtained or obtainable by a process of the present invention as described therein.

The sunflower seed protein concentrate of the invention has:
- a protein content of at least 50% dry matter w/w, pref. 55% dry matter w/w (DM), preferably at least 60% dry w/w, (N×6.25);
- a content of polyphenol compounds of less than 1% DM w/w, preferably less than 0.5% dry matter w/w;
- a fat content of less than 1% dry matter w/w, preferably less than 0.5% DM w/w, in particular less than 0.4 DM %; and/or
- a mixture of sunflower proteins which comprises both globulins and albumins,
- optionally a D50 (μm) average particle size comprised between 25 μm and 100 μm, preferably between 25 μm and 50 μm, more preferably between 30 μm and 40 μm.

The sunflower seed protein concentrate, obtained or obtainable by the process of the present invention has preferably a water holding capacity (WHC) of at least 2 g/g, preferably from 2.5 g/g to 3.0 g/g, in particular around 2.9 g/g; the method for measuring the WHC being described in the Examples below.

The sunflower seed protein concentrate obtained or obtainable by the process of the present invention is preferably insoluble, that is has a protein solubility of less than 10%, in an aqueous solution at a pH ranging from 3 to 8; the solubility being measured by the method described in the Examples (see infra). Preferably the concentrate of the invention has a protein solubility of less than 7%.

The sunflower seed protein concentrate obtained or obtainable by the process of the present invention may have good emulsifying property and/or a minimum gelling concentration of about 10% w/w in water.

The sunflower seed protein concentrate, obtained or obtainable by the process of the present invention, has advantageously a cellulose content ranging from 2% to 10% DM w/w, preferably from 3% to 6% DM w/w.

Uses and Methods

The sunflower seed protein concentrate according to the invention can be used in the food industry or feed industry, in particular for preparing a food product. In particular these food products can be related to bakery and cereals (ex. bread, biscuits, snack, cereals, and nutritional bars).

As the sunflower seed protein concentrate above described has a high water holding (absorption) capacity it is particularly well suited to be used as an ingredient (e.g., a structuring agent) for preparing meat based products (such as nuggets, knacks, ham or burgers) as well as meat (partial or total substitutes) in particular as meat alternatives (100% vegetarian products) (cf. Kyriakopoulou et al., 2019).

The invention also provides a process of making a foodstuff, a beverage or a food supplement, by adding and/or mixing any one of an sunflower seed protein concentrate above described, or a mixture thereof, to other ingredients.

Another object of the invention is the use of any one of a sunflower seed protein concentrate above described, or a mixture thereof, as a biofuel or bio-material or bio-composite, e.g. building materials.

Another object of the invention is the use of an oilseed protein concentrate above described, or a mixture thereof, as an animal feed or a food or a dietary supplement or additive for animal and/or human consumption.

Foregoing and other objects and advantages of the invention will become more apparent from the following detailed description, which refers to non-limiting examples illustrating the uses according to the invention.

BRIEF DESCRIPTION OF THE SEVERAL VIEWS OF THE DRAWINGS

FIG. 1 shows the gelling capacity of a sunflowerseed concentrate according to the invention before heating FIG. 2 shows the gelling capacity of a sunflowerseed concentrate according to the invention after heating

EXAMPLES

Figure 3:
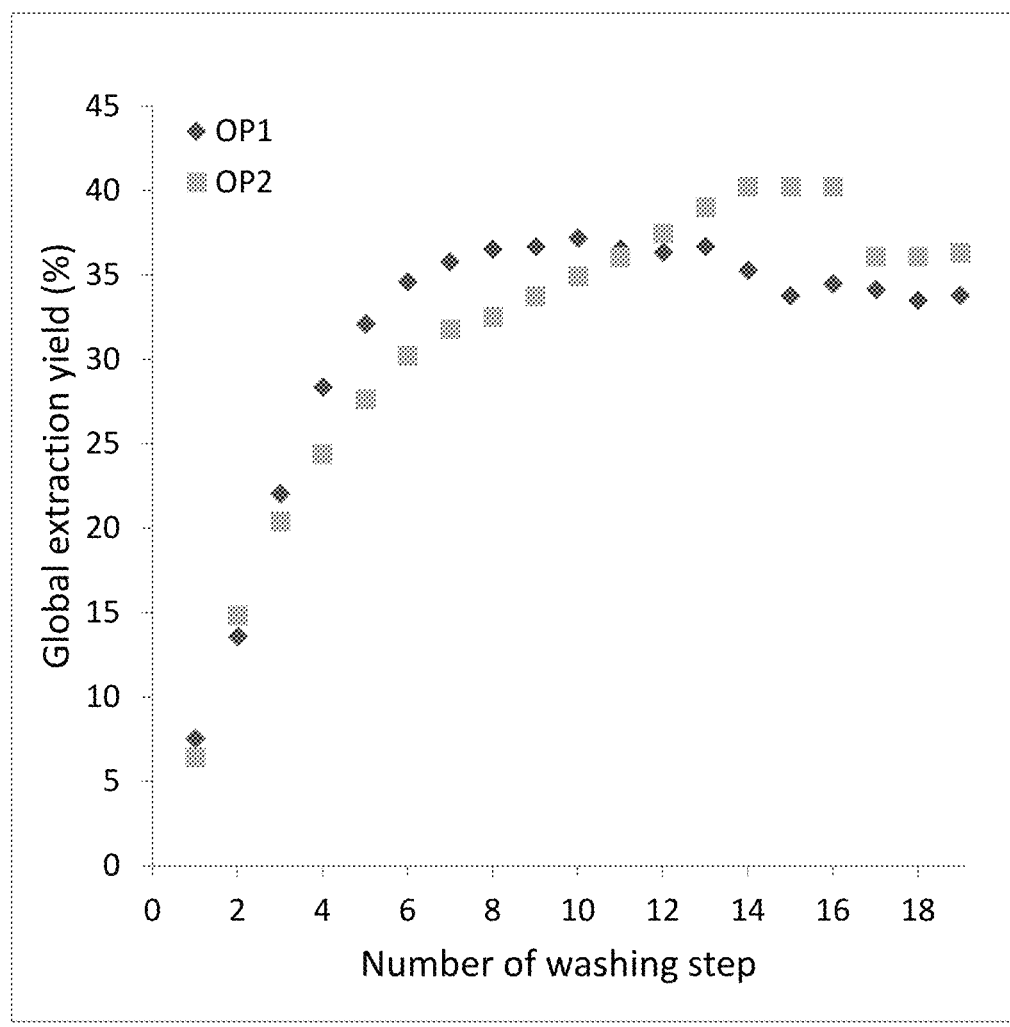
FIG. 3 is shown the extraction yield of each batch (OP1 and OP2) of sunflower seed meal processed according to the invention.
Figure 4:
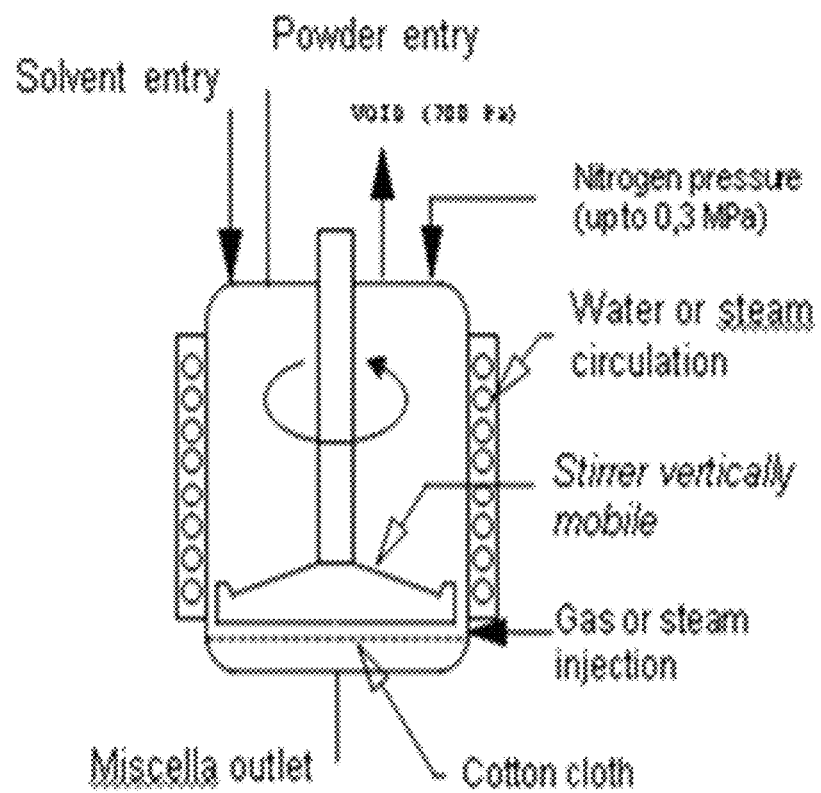
FIG. 4 is a schematic representation of a filter tank which can be used to carry out some of the steps, such as steps b) to e), of the process of the invention.

The following examples were carried to exemplify the process of the invention.

The samples were analysed within 2 weeks from their production and were kept at room temperature (max 25° C.) and away from light exposure. The analytical methods used in these experiments were the following:

Dry matter: Total dry matter concentration in % (w/w) was determined using the French Standard NF EN ISO 6498 (2012)

Humidity %: is determined by the formula 100-Dry matter concentration (see above).

The analytical methods used in these experiments were the following:

Protein content: The protein content was determined by the Dumas/Kjeldahl method according to the French Standard (Norme AFNOR) NF EN ISO 16634-1. A conversion factor of 6.25 (N*6, 25) was used to determine the amount of protein (% (w/w)).

Ash content: The total ash content was determined according to the method described in the French Standard NF V18-101 (1977) entitled "Dosage des cendres brutes"/"Measurement of raw hashes". The samples were preliminary grinded using a Retsch Griner with a 1 mm grid.

The following changes were made to NF V18-101 (1977):

The NF V18-101 Standard recommends to first carbonising the test sample using a flame treatment or a progressive heating on a hot plate before it putting it in a muffle furnace at 550° C. for a period of three hours. The method used to measure the ash content in the example avoids this preliminary calcination step, by increasing the heating time in the muffle furnace at 550° C. from three (3) to thirteen (13) hours.

In the event that the sample is insufficiently calcined, the Standard NF V18-101 requires the ashes to be moistened with pure water, dried in a drying oven (about 1 hour), then heated for 1 hour in the muffle furnace. In the present case, it is recommended to increase the 1 hour heating of the dried sample in the muffle oven from 1 to 13 hours at 550° C. The resulting ash content is provided as a (w/w) percentage of the sample original weight.

Fat content: The fat content (% (w/w)) was determined according to the Standard NF ISO 6492-B (2011) entitled "Aliments des animaux—Determination de la teneur en matiere grasse/Animal feeding stuffs—Determination of fat content" which measure the fat content after carrying out an hydrolysis with 3N aqueous chlorohydric acid. The samples were preliminary grinded using a RETSCH Grinder ZM 20 to achieve an average size of 1 mm/using glass bead of 1 mm.

The following changes were made to NF ISO 6492-B (2011):

The mass of the sample being analysed was reduced to 0.8 g.

NF ISO 6492-B(2011) recommends the use of a Soxhlet extractor. Instead an automated system such as the one sold under Soxtec™ by FOSS (Denmark) was used.

Total polyphenols content: measured by the following colorimetric protocol:

REFERENCE 0.15 g of gallic acid (from Riedel Haen, ref. 27645) mixed with 100 ml of water is further diluted in 900 mL of water (ratio 1/10). Then 50 mL vials containing 0.0 mL, 0.5 mL, 1 mL and 2 mL of this solution are further diluted with 30 mL of water. A 1 mL aliquot from each vial is poured in a 50 ml vial and 30 ml of water are added. Then, 2.5 ml of Folin-Ciocalteu reagent (2N Sigma ref. F9252) is added to the vial and the vial is agitated. 7.5 ml of a solution of sodium carbonate (20% (w:w) of anhydrous sodium carbonate) are then added. After 30 seconds, the mixture is agitated and then let to rest for 1 H30 mn at room temperature. The total volume is then adjusted to 100 mL by adding more water to the vials. Absorbance of these solutions is measured at 765 nm using UV/VIS spectrophotometer against distilled water and a standard or calibration curve is obtained.

Samples:

The samples are prepared by grinding each of the solid samples with a ball mill. The powder used has a maximum size of the particles of 1 mm. 1 g of this powder is weighted in a 100 mL vial. Close to 100 mL of a mixture of MeOH/water/acetone/HC(1N), having the relative proportion 40/38/20/2, (v:v), is added to the sample. The vial's content is agitated for 1 h at 60° C. in a bain-marie. The total volume is then adjusted to 100 mL by adding more solvent.

A 1 mL aliquot from each vial is poured in a 50 ml vial and 30 ml of water are added. Then, 2.5 ml of Folin-Ciocalteu reagent (2N Sigma ref. F9252) is added to the vial and the vial is agitated. 7.5 ml of a solution of sodium carbonate (20% (w:w) of anhydrous sodium carbonate) are then added. After 30 seconds, the mixture is agitated and then let to rest for 1H30 mn at room temperature. The total volume is then adjusted to 100 mL by adding more water to the vials. Absorbance of these solutions is measured at 765 nm using UV/VIS spectrophotometer against distilled water. The total phenolic content was read against the calibration curve and the results are expressed as micrograms per milliliter of gallic acid equivalents (µg/mL of GAE). The measures are duplicated.

Protein solubility: The protein solubility was tested on protein suspensions at 2% (w/w) dry matter content at pH 4, 6 and 8. The protein solubility was estimated by the Kjeldahl method on the supernatant after centrifugation (15000 g, 10 mi. The calculation of percentage of proteins solubility=Proteins in the supernatant %×100/proteins initially put in the solution.

REFERENCE 0.15 g of gallic acid (from Riedel Haen, ref. 27645) mixed with 100 ml of water is further diluted in 900 mL of water (ratio 1/10). Then 50 mL vials containing 0.0 mL, 0.5 mL, 1 mL and 2 mL of this solution are further diluted with 30 mL of water. A 1 mL aliquot from each vial is poured in a 50 ml vial and 30 ml of water are added. Then, 2.5 ml of Folin-Ciocalteu reagent (2N Sigma ref. F9252) is added to the vial and the vial is agitated. 7.5 ml of a solution of sodium carbonate (20% (w:w) of anhydrous sodium carbonate) are then added. After 30 seconds, the mixture is agitated and then let to rest for 1 H30 mn at room temperature. The total volume is then adjusted to 100 mL by adding more water to the vials. Absorbance of these solutions is measured at 765 nm using UV/VIS spectrophotometer against distilled water and a standard or calibration curve is obtained.

Samples:

The samples are prepared by grinding each of the solid samples with a ball mill to obtain a powder wherein the maximum size of the particles is 1 mm. 1 g of this powder is weighted in a 100 mL vial. Close to 100 mL of a mixture of MeOH/water/acetone/HCl (1N), having the relative proportion 40/38/20/2, (v:v), is added to the sample. The vial's content is agitated for 1 h at 60° C. in a bain-marie. The total volume is then adjusted to 100 mL by adding more solvent.

A 1 mL aliquot from each vial is poured in a 50 ml vial and 30 ml of water are added. Then, 2.5 ml of Folin-Ciocalteu reagent (2N Sigma ref. F9252) is added to the vial and the vial is agitated. 7.5 ml of a solution of sodium carbonate (20% (w:w) of anhydrous sodium carbonate) are then added. After 30 seconds, the mixture is agitated and then let to rest for 1H30 mn at room temperature. The total volume is then adjusted to 100 mL by adding more water to the vials. Absorbance of these solutions is measured at 765 nm using UV/VIS spectrophotometer against distilled water. The total phenolic content was read against the calibration curve and the results are expressed as micrograms per milliliter of gallic acid equivalents (µg/mL of GAE). The measures are duplicated.

Sugars content: The content of sugars (% (w/w)) was determined using the Luff Schoorl method as described in UE Regulation 152/2009.

The contents of Neutral Detergent Fibers (NDF), Acid Detergent Fibre (ADF) and Acid Detergent Lignin (ADL) were determined according to the French Standard NF V18-122 (2013)

Phosphorus content: The content of phosphorus (% (w/w)) was determined according to the French Standard NF ISO 6491(2011).

Soluble/insoluble fibers content: The content of soluble and the content of insoluble fibers (% (w/w) were determined using the Standard AOAC 991-43 (1995) Sodium content: The content of sodium (% (w/w)) was determined according to the French Standard NF EN ISO 6869 (2002).

Amino acids: The content of amino acids (% (w/w)) in a protein concentrate (amino acid profile) was determined according to the French Standard NF EN ISO 13903/04 (2005).

Protein solubility: The protein solubility was tested on protein suspensions at 2% (w/w) dry matter content at pH 4, 6 and 8. The protein solubility was estimated by the Kjeldahl method on the supernatant after centrifugation (15000 g, 10 min). The calculation of percentage of proteins solubility=Proteins in the supernatant %×100/proteins initially put in the solution Emulsifying capacity: The emulsifying capacity represents the amount of oil that the protein concentrate is able to emulsify. A solution at 1.5% (w/w) dry matter was prepared in water. After 1 h of solubilisation under agitation at 500 rpm, the protein solution was shaken at 6 000 rpm by an IKA shaker. Sunflower oil was continuously added in the proteins solution under stirring at 6000 rpm with a flow of 50 mL/min. The maximum oil capacity was evaluated by phase inversion visually and by conductimetry. The reference used for this test is sodium casein.

Water holding capacity: The water holding capacity was measured by adding samples in water at a concentration of 20 mg/ml of dry matter. Solutions were blended 1 hour under stirring. After centrifugation at 15000 g during 10 min, the water content of the pellet was measured and compared with the initial weight of materials. Results are expressed as the numbers of times that sample retain its weight in water.

Minimum gelling concentration: Minimum gelling concentration was measured by preparing solutions from 2% to 20% (w/w) protein content in test tubes at pH 6. After solubilization, solutions were heated 1 h in a water-bath at 85° C. and then cooled 2 h at 4° C. A solution was considered to have formed a gel if it behaved like a liquid before heating (i.e. free-flowing) and did not flow when test-tube was put upside-down after heating.

Example 1

The starting material were oleic sunflower kernels (supplied by the company FLANQUART SAS, Z. I. B—Impasse du Plat Rio BP 5•62232 ANNEZIN—FRANCE). The composition of the 100% dehulled sunflower seed starting material is given in table 1, below.

TABLE 1

| Composition of the starting material | |
|---|---|
| Product Composition | Sunflower Kernels In wt % to total mass |
| Protein (Nx6.25) | 23.2% |
| Moisture | 4.0% |
| Fat | 55.6% |
| Ash | 3.2% |
| Sugars | 5.1% |
| Polyphenols | 2.3% |
| Cellulose | 3.8% |
| NDF | 6.7% |
| ADF | 4.0% |
| ADL | 0.7% |
| Phosphorus | 0.7% |

The kernels were crushed to extract the oil using a screw press MBU20 sold by the French Company OLEXA (Feuchy, FR). The temperature within the press was 67° C. The rotation speed was stabilized at 10 Hz. 299 kg of kernels were pressed in two batches to produce a total of 95 kg of press cake. The composition of each of the two batches is shown in Table 2 below.

TABLE 2

| | | Batch 1 | Batch 2 |
|---|---|---|---|
| Dry matter (DM) | % | 92.1 | 92.2 |
| Oil | %/DM | 24.9-26.6 | 24.9-26.6 |

The mass balance of the pressing step is shown in Table 3 below.

TABLE 3

| Pressing step | Flow | Weight (kg) | Dry matter (%) | Oil content (%/DM) |
|---|---|---|---|---|
| Kernel | In | 299 | 94.7 | 55.2 |
| Press cake | Out | 170 | 92.2 | 24.9-26.6 |
| "Fines" | Out | 18 | | |

4 different solvents, each associated with a set number of washing (or de-oiling) steps were successively used on these batches of sunflower seed press cake to carry out the extraction, or purification, of the proteins. These solvent/washing steps were as follows:

Ethanol 96%: 8 washing steps of 10 minutes,
Acidified Ethanol 80% (Water 20%): 8 washing steps of 15 minutes,
"Alkali" Ethanol 70% (Water 30%): 2 washing steps of 15 minutes, and
Ethanol 96%: 1 washing step of 15 minutes.

Several steps of washing are used to remove the oil from the cake, as well as small soluble components such as polyphenols, sugars, salts etc. The washing or extracting steps were carried out in an agitated filter tank (Guedu—capacity 400 litres—supplier De Dietrich). This device is equipped with a stirrer vertically mobile, a jacket for hot steam or water circulation to heat the product and a cotton cloth (De Dietrich) with a 10 µm mesh for the liquid—solid separation. During each washing step, or extraction step, the pressed meal was immersed in a solvent at a specific temperature, according to a determined time, and under an agitation of 21-24 rpm. The sunflower seed press cake was then processed as follows:

Extraction 1: Ethanol 96%: 8 Washing Steps of 10 Minutes Each

The first solvent used was ethanol 96% in water. The temperature set was ranging from 55-65° C. In order to optimize the de-oiling step to obtain a final product with the best quality as possible, fresh solvent was used for the $1^{st}$, $2^{nd}$ and $8^{th}$ washing steps. The other washing steps were done with recycled solvent from the previous washes using a distillation column. The total ratio sunflower seed press cake/liquid solvent was 1/16 (w/w) for batch 1 and 1/19 (w/w) for batch 2. The processing time for each wash was about 10 minutes.

By total ratio sunflower seed press cake/liquid solvent it is meant the weight of the sunflower seed press cake on total solvent used. In this example the ratio sunflower seed press cake/liquid solvent for each wash was around 1/2 for the first batch and 1/[2.3 to 2.4] for the second batch.

Extraction 2: Ethanol 80% at an Acidic pH—8 Washing Steps of 15 Minutes Each

The solid from the extraction step 1 obtained by filtration (percolation) was mixed with an acidic 80% ethanol solution and the pH adjusted with phosphoric acid 75%. The objective was to obtain slurry (solid+ethanol solution) with a pH from 3 to 6, ideally between 4 and 5. The pH of the spent liquid washes (i.e.miscella) was measured and they ranged from 5.2 to 3.1. The total ratio sunflower seed press cake/liquid solvent was 1/21.3 (w/w) for batch 1 and 1/21.7 for batch 2. Fresh solvent was used for the 1$^{rst}$ washing step. The remaining washing steps were done with recycled solvent from the previous washes. The temperature of the 8 successive washing steps was 55-60° C. By total ratio sunflower seed press cake/liquid solvent it is meant the weight of the sunflower seed press cake on total solvent used The meal was sieved (sieve 0.4 mm) and a sample of the solids obtained after different washes were taken to control the elimination of the chlorogenic acid. 1 g of meal was mixed with 50 g alkali water (with NaOH) and the pH was adjusted until pH 9. After 1 h at room temperature the pH was measured and adjusted to pH 9, if necessary. Then the suspension was filtered and a picture was taken. When no green or greenish hue was detected, it was considered that the amount of chlorogenic acid was low enough for food application. A green hue was clearly present in the samples from the second and fourth washes but was barely present in the samples from the 6th washes onwards.

Extraction 3: Ethanol 70% at Alkali pH: 2 Washing Steps of 15 Minutes

The solid from extraction step 2 obtained by filtration (percolation) was mixed with an alkali 70% ethanol solution. The alkali solution was obtained by adding a 30% w/w aqueous solution of sodium hydroxide to the ethanol solution already admixed to the solid until a pH ranging from 6 to 7 was obtained. The amount added was about 13.1 kg of NaOH 30% for both batches. Both successive washing steps took place at a temperature ranging from 55-60° C. The sunflower seed press cake/liquid solvent total ratio was respectively 1/5.7(w/w) and 1/5.7 (w/w) for the two different batches.

Extraction 4: Ethanol 96% 1 Washing Step of 15 Minutes.

The solid from the extraction step 3 obtained by filtration (percolation) was mixed with ethanol 96% at a temperature ranging from 55-60° C. The sunflower seed press cake/solvent total ratio was 1/2.6 (w/w) for both batches.

Desolventation

The solid fraction obtained by filtration (percolation) is desolventised (i.e. the solvent is removed) in the agitated filter tank used to carry out the extraction steps (Guedu; capacity 400 litres—De Dietrich Process Systems). A vacuum is applied (0.7 bar) at a temperature inferior to 60° C. for 3 h. The temperature after three hours was about 45° C. Then the solid was stored in specific wagons for 2 days, with specific ventilation with hot air to optimize the solvent removal.

The mass balance of each two batches "OP1" and "OP2" (obtained according to the same conditions) is shown in Table 4.

TABLE 4

| | Flow | Total weight (kg) | Dry matter (%) | Weight of Dry matter (kg) |
|---|---|---|---|---|
| Batch OP1 | | | | |
| Pressed meal (pressed cake) | in | 78 | 92.2 | 71.9 |
| Phosphoric acid 75% water 25% in wt % | in | 11.1 | 75 | 8.3 |
| NaOH 30% and 70% water | in | 7.1 | 30 | 2.1 |

TABLE 4-continued

| | Flow | Total weight (kg) | Dry matter (%) | Weight of Dry matter (kg) |
|---|---|---|---|---|
| in wt % | | | | |
| Extracted dry matter | out | 32.8 | 100 | 32.8 |
| Desolvented meal | out | 42.2 | 90 | 38.0 |
| Losses | =in-out | | | 11.6 |
| Batch OP2 | | | | |
| Pressed meal | in | 92 | 92.1 | 84.7 |
| Phosphoric acid 75% water 25% in wt % | in | 13.4 | 75 | 10.1 |
| NaOH 30% and 70% water in wt % | in | 6.0 | 30 | 1.8 |
| Extracted dry matter | out | 34.1 | 100 | 34.1 |
| Desolvented meal | out | 53.0 | 90 | 47.7 |
| Losses | =in-out | | | 14.8 |

The yield of extraction was estimated at 37-40% on the dry matter of pressed meal. The yield is decreasing after the 14$^{th}$ washing step, which corresponds to the 6$^{th}$ acidic washing step.

In FIG. 3 is shown the extraction yield of each batch (OP1 and OP2) of sunflower seed meal processed according to the invention.

Milling

After drying (desolventization under vacuum conditions), both concentrates thus obtained were mixed together and milled (HOSOKAWA ALPINE 200 AFG—SD-TECH) to get a homogeneous product, which was close to soy protein concentrate.

The average size particle of the sunflower protein concentrate before and after milling was measured using laser diffraction (Mastersizer 2000, Malvern, cell, dispersion unit Hydro 2000, dispersant: Alcool, refractive index: 1,52, Absorption: 0,1).

The results are shown in Table 5 below.

TABLE 5

| Size particle | D50 (µm) | D90 (µm) |
|---|---|---|
| Before milling | 254 | 736 |
| After milling | 36 | 138 |

The final product was mainly a mix of insoluble proteins and insoluble fibers. Its composition, the amino acid profile and the solubility as a function of pH of the sunflower protein concentrate is shown in Table 6, 7 and 8, respectively.

TABLE 6

| Protein (Nx6.25) | 64.9% | Sugars | 0.5% |
|---|---|---|---|
| Protein (Nx5.5) | 57.1% | Polyphenols | 0.4% |
| Moisture | 8.0% | Other | 4.3% |
| Fat | 0.3% | Cellulose | 4.7% |
| Ash | 13.0% | pH (2% in water) | 6.15 |

TABLE 7

| Amino acids profile | % (w/w) as is | g/100 g protein (Nx6.25) | FAO 2007 (g/100 g protein) | Amino acid score (%) |
|---|---|---|---|---|
| Aspartic acid | 5.65 | 8.7 | | |
| Glutamic acid | 13.02 | 20.1 | | |
| Alanine | 2.58 | 4.0 | | |

TABLE 7-continued

| Amino acids profile | % (w/w) as is | g/100 g protein (Nx6.25) | FAO 2007 (g/100 g protein) | Amino acid score (%) |
|---|---|---|---|---|
| Arginine | 5.57 | 8.6 | | |
| Cysteine | 0.9 | 1.4 | | |
| Glycine | 3.89 | 6.0 | | |
| Histidine | 1.58 | 2.4 | 1.5 | 162% |
| Isoleucine | 2.58 | 4.0 | 3.0 | 133% |
| Leucine | 3.86 | 5.9 | 5.9 | 101% |
| Lysine | 2.33 | 3.6 | 4.5 | 80% |
| Methionine | 1.24 | 1.9 | | |
| Methionine + cysteine | 2.14 | 3.3 | 2.2 | 150% |
| Phenylalanine | 3.02 | 4.7 | | |
| Phenylalanine + tyrosin | 4.93 | 7.6 | 3.8 | 200% |
| Proline | 2.92 | 4.5 | | |
| Serine | 2.53 | 3.9 | | |
| Threonine | 2.28 | 3.5 | 2.3 | 153% |
| Tyrosine | 1.91 | 2.9 | | |
| Valine | 2.7 | 4.2 | 3.9 | 107% |
| Tryptophan | 0.83 | 1.3 | 0.6 | 213% |

The solubility of this ingredient is very low.

TABLE 8 solubility as a function of pH of sunflower protein concentrate
% Protein solubility at room temperature

| pH 4 | pH 6 | pH 8 |
|---|---|---|
| 5.8% | 5.2% | 6.7% |

The concentrate has good emulsifying properties 1.5 g of concentrate (equivalent to about 1 g protein) can emulsify 344 g of sunflower oil.

It has good Water Holding Capacity: 1 g of ingredient can retain 2.9 g of water.

Suspensions were prepared from 2% protein content to 20% protein content at pH 6. Above 16% protein content, suspensions formed a paste prior to heating without any flow properties (see FIG. 1), making gelling test irrelevant at these concentrations. After heating 1 h at 85° C. (cf. above), the solutions fully gelled at 10% protein concentration and higher (See FIG. 2), which means that the minimum gelling concentration of the ingredient is 10%.

REFERENCES

Kyriakopoulou, K. (2019). Chapter 6: Plant-Based Meat Analogues. *In: Sustainable Meat Production and Processing*. Galanakis, Charis, Academic Press, ISBN 9780128148747, pp. 103-126.

Laisney, J. (1984). *L'huilerie moderne*. Compagnie Française pour le Dévelopment des Fibres Textiles (CFDT).

Laisney J. (1996). Chapter 9: Processes for Obtaining Oils and Fats—1.1 General Principles of Trituration In. A. Karleskind (eds) *Oils and Fats Manual* (Vol. I) by A. Karleskind and J. P. Wolff, Lavoisier Publishing, pp 715-751.

Matthaus, B. (2012). Chapter 2: Oil Technology. In: S. K. Gupta (ed.), *Technological Innovations in Major World Oil Crops, Volume 2: Perspectives*, New York: NY Springer Science+Business Media, LLC, pp 23-92.

Unger, E. H. (1990). Commercial Processing of Canola and Rapeseed: Crushing and Oil Extraction. In: Shahidi F. (eds) *Canola and Rapeseed*. Springer, Boston, MA, pp 235-249.

The invention claimed is:

1. A process for producing a protein concentrate from sunflower seed, comprising the steps of:
    a) pressing oilseed to form a sunflower seed press cake;
    b) de-oiling said sunflower press cake by mixing said sunflower seed press cake with an alcohol and removing the alcohol from a solid de-oiled sunflower seed meal;
    c) extracting said de-oiled sunflower seed meal at a pH ranging from 3 to 6 with a first solution comprising an alcohol diluted with water to obtain a first extracted solid and removing said first solution from said first extracted solid;
    d) extracting said first extracted solid with a second solution comprising, or consisting essentially of, an alcohol and an alkali, to obtain a second extracted solid and removing said second solution from said second extracted solid to obtain a sunflower seed protein concentrate;
    e) extracting said second extracted solid with an alcohol; and
    f) recovering said sunflower seed protein concentrate.

2. The process of claim 1, wherein said sunflower seed press cake is obtained by cold-pressing at a temperature of 74° C. or less.

3. The process of claim 1, wherein said step b) is repeated more than 4 times.

4. The process of claim 1, wherein said step c) is repeated more than 4 times.

5. The process of claim 1, wherein said step d) is repeated at least 5 times.

6. The process of claim 1, wherein said step d) is carried out at a pH ranging from 5.5 to 7.5.

7. The process of claim 1, wherein in said step d) said second solution comprises or consists essentially of an alcohol diluted with water.

8. The process of claim 1, wherein said step d) is followed by the step e) of extracting said second extracted solid with an alcohol to obtain a sunflower seed protein concentrate.

9. The process of claim 1, wherein said sunflower seed protein concentrate is subjected to a desolventizing step.

10. The process of claim 1, wherein the alcohol used in at least one of the steps b), c), d), or e) is ethanol.

11. The process of claim 1, wherein said step b) is repeated more than 6 times.

12. The process of claim 1, wherein said step d) is carried out at a pH ranging from 6 to 7.

13. The process of claim 1, wherein the alcohol used steps b), c), d), and e) is ethanol.

14. The process of claim 1, wherein the sunflower seed press cake is not treated with hexane or n-hexane.

15. The process of claim 1, wherein the alcohol diluted in the first solution, is diluted with more than 10% v/v water.

16. The process of claim 1, wherein a concentration of the alcohol over the water in the step c) ranges from 75 to 85% (v/v).

17. The process of claim 1, wherein a concentration of the alcohol over the water in the second solution of the step d) ranges from 60 to 80% (v/v).

18. The process of claim 1, wherein the second solution contains 0.4 wt. % to 1 wt. % of the alkali.

* * * * *